June 18, 1963     J. A. O'CONNOR ETAL     3,094,679

SILICON CARBIDE RESISTANCE BODY AND METHOD OF MAKING THE SAME

Filed Jan. 13, 1960

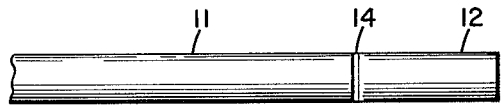

Fig.1

---

JOINING THE HOT SECTION OF A SILICON CARBIDE
ELECTRICAL RESISTANCE HEATING ELEMENT
TO A COLD END WITH A CARBON - CONTAINING
WELDING COMPOSITION.

---

SILICONIZING THE JOINT TO FORM A WELD OF
BETA SILICON CARBIDE CONTAINING FREE CARBON
AND FREE SILICON.

---

ANNEALING THE JOINT AT A TEMPERATURE IN
EXCESS OF 1800°C. TO INCREASE THE PERCENTAGE
OF SILICON CARBIDE IN THE JOINT AND TO REDUCE
THE CONTENT OF FREE SILICON AND FREE CARBON.

Fig.2

INVENTORS.
JOHN A. O'CONNOR
STANLEY J. MATYS
BY

AGENT

United States Patent Office 3,094,679
Patented June 18, 1963

3,094,679
SILICON CARBIDE RESISTANCE BODY AND METHOD OF MAKING THE SAME
John A. O'Connor, Williamsville, N.Y., and Stanley J. Matys, Wellandport, Ontario, Canada, assignors to The Carborundum Company, Niagara Falls, N.Y., a corporation of Delaware
Filed Jan. 13, 1960, Ser. No. 2,216
12 Claims. (Cl. 338—330)

This invention relates to a silicon carbide body of improved and highly desirable characteristics, and to a process for producing such a body. More specifically, the invention relates to a silicon carbide electrical resistance heating element of improved characteristics, and to a process for producing it.

One common form of modern silicon carbide electrical resistance heating element is a rod or tube that has a central portion of relatively high electrical resistance and that is often referred to as the hot section of the element, and terminal portions of relatively lower electrical resistance, that are secured to the ends of the hot section, and that are often referred to as cold ends. The hot section usually is formed of recrystallized silicon carbide. The cold ends frequently are formed from siliconized silicon carbide. Such elements are available in a variety of shapes and sizes.

Some of the techniques that may be employed in the manufacture of cold-ended silicon carbide electrical resistance heating elements are described in the following representative three United States patents, all of which issued to Albert H. Heyroth: 1,906,963, granted May 2, 1933; 2,319,323, granted May 18, 1943; and 2,431,326, granted November 25, 1947.

According to one technique for manufacturing an electrical resistance heating element of this type, the hot section is formed by heating a shape of temporarily bonded silicon carbide grain to recrystallize the grain so that it becomes self-bonded, and the cold ends are formed by forming porous, bonded carbon bodies and then siliconizing these bodies to convert them to siliconized silicon carbide. When the heating element is in the form of an elongate rod or bar, two cold ends are secured to one hot section, one at each end thereof.

One technique for securing a cold end to a hot section involves temporarily bonding the cold end to the hot section with a carbon-containing temporary binder, in the form of a thin coating between the parts to form a temporary joint, and then siliconizing this joint to convert the carbon of the binder to siliconized silicon carbide. The siliconizing of such a joint is usually referred to in the art as welding, and the joint is usually referred to as a welded joint. During the welding process, a substantial excess of silicon ordinarily is employed, in order to insure complete siliconization, and also to provide sufficient silicon to diffuse into the portions of the hot section and of the cold end adjacent the joint. The free silicon in the joint itself and in the portions of the element adjacent the joint tends to decrease the electrical resistance.

Electrical resistance heating elements made in this way have enjoyed widespread usage and have proved to be extremely valuable for a large number of industrial heating applications. Continuous and extended observation of the performance of such elements, however, has led to the conclusion that such elements could be improved considerably, particularly as to performance under extreme conditions.

For example, it has been observed that a cold-ended silicon carbide electrical resistance heating element, made in the manner described above, may prove troublesome when the element is operated at a temperature in excess of about 2500° F., because the free silicon in the joint oozes out of the joint, and also, to some extent, out of the cold end. This silicon exudate tends to become attached to the furnace brickwork or other supporting structure, and tends to unite the heating element to its supporting structure. Thereafer, this attachment of the heating element to its supporting structure tends to prevent the element from expanding and contracting, and this leads to element breakage.

The free silicon content of a typical welded joint and cold end, of siliconized silicon carbide, usually is in the range from 35% to about 50% by weight of each of the joint and cold ends respectively, and invariably exceeds 20%; only rarely does the free silicon content of the joint not exceed 30% by weight of the joint. Because of the desirable electrical characteristics that are attributed to this free silicon, in the past no real effort has been made to decrease the free silicon content of the joint.

It has also been observed that the conventional welding technique introduces internal stresses at the joint and in the portions of the heating element adjacent the joint, because of thermal shock. The thermal shocking apparently is caused by the production of an extremely high temperature, about 1800° C. or higher, at the joint and in its immediate vicinity, in an extremely short period of time, followed by rapid cooling. Thermally shocked heating elements are believed to contain internal faults in the form of fractures or partings, and they tend to fail, usually unpredictably, along these faults, that unfortunately cannot be detected easily by present inspection techniques.

It has also been observed that the free silicon in the joint is somewhat susceptible to oxidation at high temperatures. This leads to electrical instability, and oxidation of the free silicon may be responsible for the increase in electrical resistance that is frequently observed during operating life.

One object of the present invention is to provide an improved silicon carbide electrical resistance heating element.

Another object of the invention is to provide a siliconized silicon carbide body of improved characteristics.

A more specific object of the invention is to provide a silicon carbide electrical resistance heating element that will provide superior performance under high temperature operating conditions.

Another object of the invention is to provide a cold-ended silicon carbide electrical resistance heating element having superior welded joints securing the cold ends to the hot section of the element.

Another object of the invention is to provide a siliconized silicon carbide body, and specifically a siliconized silicon carbide body for use in an electrical resistance heating element, that will not exude free silicon at high temperatures.

A related object of the invention is to provide a siliconized silicon carbide body for electrical resistance heating applications, that is characterized by a relatively low volume electrical resistivity and by stable electrical operating characteristics even after prolonged use at elevated temperatures.

Still another object of the invention is to provide a refractory body consisting primarily of silicon carbide, and derived from siliconized silicon carbide, that has superior resistance to oxidation at high temperatures, as compared to siliconized silicon carbide bodies previously known.

A more specific object of the invention is to provide a compound silicon carbide body that is made of a plurality of shapes that are united by a welded joint, and that is substantially free from internal stress caused by thermal shock such as has been commonly caused by welding techniques that have been employed in the past.

Another object of the invention is to provide processes that can be employed for making bodies and electrical resistance heating elements having the desirable aforesaid properties and characteristics.

More specifically, it is an object of the invention to provide a practical process for making a cold ended silicon carbide electrical resistance heating element, that will produce an improved heating element that is particularly characterized by superior performance at elevated temperatures and by superior strength.

Other objects of the invention will be apparent hereinafter from the specification and from the recital of the appended claims.

It has been found, according to the present invention, that the properties of a siliconized silicon carbide body, that contains significant quantities of free carbon and free silicon in addition to silicon carbide, can be altered or modified to a substantial extent, to make the body much more desirable for certain applications. This invention involves the use of a process in which the body is maintained at a temperature in excess of about 1800° C., for a sufficient period of time to increase the percentage of silicon carbide in the body by combination of the free silicon and free carbon of the body to form silicon carbide in situ, and to reduce the free silicon content of the body significantly, preferably to at least one-half of the original free silicon content.

This process is particularly applicable to the production of a body for electrical resistance heating applications, and in which the silicon carbide is originally in the beta form. In practicing the process, for a body for such an application, the body is heated and the time-temperature conditions of the process are carefully controlled so that the silicon carbide remains primarily in the beta form. However, important advantages can also be obtained through practice of the process, for the production of bodies for applications other than in the electrical resistance heating field, where the time-temperature conditions are such that the silicon carbide is partially, substantially, or entirely converted to the alpha form.

The invention has particular application to the treatment of the welded joint between the hot section and the cold end of a silicon carbide electrical resistance heating element. A heating element that is formed with a welded joint, in accordance with this invention, has an increased percentage by weight content of silicon carbide, and a materially reduced content of free silicon and of free carbon. Such a welded joint has been found to be characterized by improved resistance to oxidation and by improved strength because of the absence of thermal shock. Moreover, performance of the heating element is improved because of freedom from oozing of free silicon at high temperatures, and its higher electrical stability, which is particularly observable in the reduced heat losses from the cold ends and the cooler operating temperature of the cold ends.

In the drawing:

FIGURE 1 is a fragmentary side elevation of a cold-ended silicon carbide electrical resistance heating element, the portion thereof that is illustrated showing a part of the hot section of the element, one cold end of the element, and the welded joint that unites the cold end to the hot section, and FIGURE 2 is a diagrammatic presentation of the process steps involved in a process in accordance with one embodiment of the present invention.

A cold ended silicon carbide electrical resistance heating element was constructed in accordance with the present invention, with the apparently usual structure of a hot section 11 and a cold end 12 united by a welded joint 14.

The hot section 11, in the embodiment of the invention illustrated, was a rod of recrystallized silicon carbide, made by the extrusion of a mixture of grain with a fugitive temporary binder, followed by firing of the extruded rod to drive off the binder and to recrystallize the grain.

The cold end 12 was made of siliconized silicon carbide by preparing a finely divided mixture of the proper proportions of charcoal, wheat flour, wood flour, and pitch coke, adding a solution of a casein glue, mixing carefully, and extruding or molding the mixture to form a rod of the desired shape and size. After calcining to carbonize the extruded or molded rod and form a porous, bonded carbon shape, the shape was heated in the presence of finely divided silicon to siliconize it and to convert it to siliconized silicon carbide. A common siliconizing technique was used, involving heating the shape to a temperature of about 1800° C. for a period of about two minutes, then cooling. No special care was taken to cool the cold end since it was of relatively small diameter, although larger pieces frequently are cooled in pitch coke.

To secure the cold end 12 to the hot section 11, a standard welding composition was employed, to form the temporary joint to be welded and annealed. This composition included substantially equal parts by weight of flour and charcoal, together with about two and one-half times as much carbon as flour, all in finely divided form, with sufficient casein glue to obtain a workable consistency.

A wide variety of compositions of this general type have been found to be quite satisfactory, and the proportions of the ingredients suggested are exemplary only. Satisfactory welding compositions have also been prepared and used that were based upon carbonizable synthetic resins, such as, for example, phenolic resins. Such resins have been employed alone or in combination with carbonaceous materials such as, for example, pitch coke, charcoal, flour, graphite, or the like. Finely divided silicon carbide has been incorporated in all types of these compositions as a bodying agent. The silicon carbide powder, when used, ordinarily is in the alpha form, since the alpha form is readily available, whereas the beta form is available only on a limited basis. For electrical applications, however, the beta form is preferred when it can be obtained, because of its lower resistivity.

After joining the cold end 12 to the hot section 11 with a coating of the welding composition of just sufficient thickness to secure the parts together, the assembly was treated carefully until the welding composition had dried and set. Drying typically requires 8 or 10 hours at room temperature or a shorter period at high temperatures, such as, for example, 1 hour at 150° F. After drying, the joint was siliconized in the usual manner by heating it to about 1800° C. by positioning between a pair of electrodes, in the presence of powdered silicon.

The siliconized joint and, as well, the siliconized silicon carbide cold end 12, consisted of a substantial proportion of silicon carbide in the beta form, together with free carbon and free silicon. The exact proportions of the silicon carbide, carbon and silicon that are present can vary within rather broad limits, and depend upon the nature of the welding composition employed, the character and porosity of the carbon structure prior to siliconization, and, as well, upon the amount of silicon employed and the other conditions of siliconization. In general, however, the ordinary commercial products that have been available in recent years, and that have been made substantially in the manner just described, have a content of free silicon in the welded joint and in the cold end on the order of 35% or 40% up to about 50% by weight thereof, and a content of free carbon in excess of 10% and up to about 15%, or even more in some cases.

The process of the present invention was employed to improve the characteristics of this heating element, whose conventional manufacture has just been described, after the element had been welded in the ordinary way and then permitted to cool. However, the process of this invention can be and preferably is performed immediately following the siliconizing step, without permitting the welded joint to cool.

The process of this invention is referred to hereafter as an "annealing process," and the term "annealing" is employed in a broad sense to refer to a high temperature firing treatment, whose purpose it is to alter favorably the physical characteristics of the object being annealed.

The annealing process involved maintaining the welded joint, the cold end and a substantial proportion of the hot section adjacent the welded joint, at a temperature of about 2200° C. for a period of thirty minutes. This was accomplished by mounting the element in a cylindrical crucible or boat of graphite, and passing the crucible, with the element mounted in it, through a graphite tube furnace at a predetermined uniform rate, to provide a throughput time, for any given point on the crucible, of 30 minutes. A water cooled tube was mounted at the discharge opening of the furnace, to receive the crucible, and to cool it gradually to handling temperature. The crucible was pushed through the cooled tube at the same speed as through the furnace.

The graphite tube furnace was of the conventional type with water cooled ends, and a reduced diameter, high temperature center section. Consequently, as the element (in the crucible) was passed slowly into and then through the furnace, it was raised to firing temperature gradually, held over a period of time, then cooled gradually.

This treatment was found to increase the silicon carbide content of the joint and of the cold end, by combination of the free silicon and free carbon to form silicon carbide in situ, and substantially to reduce the free silicon content and free carbon content thereof. Moreover, whereas the element before annealing was known by experience to be thermally shocked, strength tests on this annealed element and on other similar annealed elements indicated greater strength and substantial absence of internal stress caused by thermal shock. It is theorized, without certain knowledge at this time, that the annealing process tends to heal the faults that are caused by thermal shocking and that are the points of weakness in an internally stressed element.

Observation of the results of the annealing of preformed thermally shocked elements indicates that a significant improvement is obtained if the time-temperature conditions of annealing are such that the content of free silicon is reduced significantly, preferably to at least one-half of the original free silicon content. More preferably, however, the free silicon content is reduced to 10% or less by weight of the welded joint and the free silicon content of the cold end is correspondingly reduced substantially to the same value. The annealed siliconized silicon carbide bodies have a density of at least 1.2 grams per cc. At a temperature of 1800° C., the annealing process may require a period of several hours. An annealing temperature on the order of 2200° C. has been found to be much more practical. At this annealing temperature, a residence period of about thirty minutes usually suffices to accomplish the desired improvement.

While temperatures between about 2200° C. and 2300° C. produce very satisfactory results during practical annealing periods, exposure to temperatures above 2300° C. for any substantial period of time is to be avoided because at this temperature the silicon carbide begins to convert at an appreciable rate to its alpha form. For some purposes, conversion to the alpha form may be highly desirable, and the present invention contemplates the use of the annealing process to this end. However, since the electrical resistance of alpha silicon carbide is many times greater than the electrical resistance of the beta form of silicon carbide, the conversion of any substantial amount of silicon carbide to the alpha form is to be avoided in the production of electrical resistance heating elements, at least where the portion of the element that is being annealed includes the welded joint and cold end that are being annealed, since the electrical resistance of these portions of the heating element should be as low as can be obtained. Accordingly, therefore, in annealing the welded joint and/or the cold end, the annealing is conducted under time-temperature conditions such that the silicon carbide remains primarily in the beta form.

In another preferred way of practicing the invention, for welding together and annealing a preformed hot section of recrystallized silicon carbide and a preformed cold end of siliconized silicon carbide, two cold ends were secured to a hot section with a resinous welding composition, and the element was then processed in a crucible, together with powdered silicon, through a tube furnace at about 2200° C., so that the joint was siliconized and the cold end and welded joint were maintained at the annealing temperature, for the desired time, with no intermediate cooling step, and consequently, no danger of thermal shocking. Before processing the element through the furnace, finely divided silicon was disposed about the joint area inside the crucible, and siliconization occurred as soon as siliconizing temperature was attained in the tube furnace. After the finely divided silicon had penetrated into the joint and the immediately adjacent protions of the element, the annealing was conducted in what was essentially an inert atmosphere.

For practical purposes, it is not necessary to maintain a strictly inert atmosphere about the element during the annealing process, but it is preferred to avoid unnecessary exposure of the element to the atmosphere. The preferred design for the annealing crucible or boat provides a substantially enclosed chamber, within which the element is, in effect confined during the annealing.

The effect of siliconizing and then annealing a joint for various periods of residence or annealing time at 2200° C., in a tube furnace, is illustrated in the following table, which shows the free silicon content in the joint at the end of the stated respective annealing period.

*Table I*

| Annealing time at 2200° C., in minutes: | Free silicon content of the weld area, percentage by weight |
|---|---|
| 50 | 6.2 |
| 40 | 6.5 |
| 30 | 10.1 |
| 25 | 12.7 |
| 21 | 17.2 |

The welding and annealing process has also been employed in conjunction with a manufacturing technique in which a preformed, carbon-containing shape, suitable for siliconization to form the cold end, was joined to a hot section by a welding composition, and was siliconized simultaneously with the joint and then annealed. While this manufacturing technique offers promise of possible economies because of reduction in handling, and reduction in the number of separate processing steps, preferred practice involves separate siliconization of the cold ends. The reasons for this preference are economic. The recrystallized silicon carbide hot sections are quite expensive, and account for a major proportion of the cost of a heating element. The cold ends are not only smaller, but are also relatively less expensive. Occasionally, a cold end must be rejected for commercial sale because of shape, color, or some other deficiency, and it is preferred that the cold ends be subjected to inspection before welding to a hot section in order to avoid the necessity of discarding an expensive hot section because of the failure to pass inspection of an attached, relatively inexpensive cold end.

A cold-ended silicon carbide electrical resistance heating element, that was produced in accordance with this invention, by welding and annealing the joint between a preformed cold end of siliconized silicon carbide and a preformed hot section of recrystallized silicon carbide, was subjected to an analysis of the welded and annealed joint. A similar analysis was made of the welded joint of a similar heating element made in accordance with conventional prior practice. The comparative analyses are tabulated below:

Table II

|  | Conventional Weld Area | Welded Area According to this Invention |
| --- | --- | --- |
| Free carbon_____percent__ | 12 | 3 |
| Free silicon_____do____ | 50 | 12 |
| Silicon carbide_____do____ | 33 | 80 |
| Electrical resistivity at 100° F_____ohm-cm__ | 0.005 | 0.005 |
| Density_____gms./cc__ | 2.4 | 2.2 |

When the welding and annealing of the joint is accomplished in a graphite tube furnace, in accordance with the preferred practice of this invention, the relatively slow heating and cooling cycles minimize thermal shocking of the portion of the element that is heated and then cooled. Consequently, the elements obtained according to the present invention are substantially free from internal stress caused by thermal shock and are less liable to failure caused by internal stress.

Observations of elements that were made with welded and annealed joints in accordance with this invention indicate that operation at extremely high temperatures, even over prolonged periods, is possible without any exudation of free silicon. In a comparison between operation of an element made in accordance with prior conventional techniques, and an element made in accordance with the present invention, at a temperature of 2800° F. for a period of 200 hours, the marked superiority of the element made in accordance with the present invention was evident. The conventional element exuded a substantial amount of free silicon not only in the immediate vicinity of the welded joint but also at portions of the element at a substantial distance from the joint, where silicon had penetrated during siliconization and had remained as free silicon. Moreover, the conventional element became extremely discolored in the joint area, and its surface was roughened not only in the joint area but in the immediately adjacent areas. In contrast, the element made according to the present invention remained smooth, exhibited only mild discoloration, and did not exude any silicon whatever, and consequently, would not present a problem by becoming adhered to the furnace structure.

Elements made in accordance with the present invention have also been observed to have greater oxidation resistance and a consequent higher electrical stability. The cold ends operated at lower temperatures and therefore involved a lower heat loss.

The process of the present invention can be practiced, if desired, in a furnace in which the entire heating element is mounted in a stationary position throughout the entire siliconizing and annealing process. A suitable boat or other device can be employed for holding and supporting the heating element during the process, and for retaining the finely divided metallic silicon, where that material is employed as the source of silicon for the siliconizing, in proper position prior to siliconization. However, the invention preferably is practiced in the manner previously described, in which a crucible containing the element is pushed at a set rate through a tube furnace. It is not essential, however, that the heated furnace cavity accommodate the entire heating element at once. For example, an element 70″ long has been welded and annealed successfully by slow passage through a tube furnace having a cavity only 30″ long.

While this invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. A process for improving the characteristics of a body formed by siliconizing a carbon-containing mass, which body comprises a substantial proportion of silicon carbide in the beta form together with substantial quantities of free silicon and free carbon, free silicon constituting at least 30% by weight of said body and free carbon constituting at least 10% by weight of said body, which comprises maintaining said body, following siliconization thereof and in the absence of substantial free silicon external to said body, at a temperature in excess of about 1800° C. but not in excess of 2300° C. for a sufficient period of time to reduce significantly the content of free silicon and free carbon while increasing the silicon carbide content, under time-temperature conditions such that the silicon carbide content of the body remains primarily in the beta form, and then slowly cooling said body.

2. A process as set forth in claim 1 in which the temperature employed is about 2200° C.

3. A process as set forth in claim 1 in which the free silicon content is reduced to at least one-half of its original value and preferably to not more than 10% by weight of said body and the free carbon content is reduced to not more than about 5% by weight of said body.

4. A process for improving the characteristics of an article which includes a welded joint between a pair of bodies where said joint comprises a substantial proportion of silicon carbide in the beta form together with free silicon and free carbon, said free silicon and free carbon constituting, respectively, at least 30% and at least 10% by weight of said joint, which comprises maintaining a substantial portion of said article including said joint, following siliconization of said joint and in the absence of substantial free silicon external thereto, at a temperature in excess of about 1800° C. but not in excess of 2300° C. for a sufficient period of time to reduce the free silicon in said joint to not more than about 10% by weight and to reduce the free carbon in said joint to not more than about 5% by weight thereof while increasing the silicon carbide content of said joint, under time-temperature conditions such that the silicon carbide in said joint remains primarily in the beta form, and then slowly cooling said article.

5. A process as set forth in claim 4 in which the temperature employed is about 2200° C.

6. A process for forming an article by joining a pair of bodies of materials selected from the group consisting of silicon carbide and a preformed carbon-containing mass which comprises securing the bodies together with a joint of a carbon-containing composition, siliconizing the carbon-containing portion of said article including said joint whereby said joint comprises a substantial quantity of silicon carbide in beta form together with substantial quantities of free silicon and free carbon, said free silicon and free carbon constituting, respectively, at least 30% and at least 10% by weight of said joint, subsequently maintaining a substantial portion of said article including said joint at a temperature in excess of about 1800° C. but not in excess of 2300° C. in the absence of substantial free silicon external thereof, for a sufficient period of time to reduce the free silicon in said joint to not more than about 10% by weight and to reduce the free carbon in said joint to not more than about 5% by weight while increasing the silicon carbide content of said joint, under time-temperature conditions such that the silicon carbide in said joint remains primarily in the beta form, and then slowly cooling said article.

7. A process as set forth in claim 6 in which the temperature employed is about 2200° C.

8. A process as set forth in claim 6 in which at least one of said bodies is formed of recrystallized silicon carbide.

9. A process as set forth in claim 6 in which one of said bodies is formed of silicon carbide and the other of said bodies is formed of porous carbon and a carbonizable substance and in which said joint and all of said other body are siliconized whereby to form in said other body as well as in said joint a substantial quantity of silicon carbide in beta form together with substantial quantities of free silicon and free carbon, and in which said joint and all of said other body are subsequently maintained at said temperature, in the absence of substantial free silicon external thereof, whereby to increase the silicon carbide content of said other body and of said joint and to reduce the free silicon and free carbon content of said joint and said other other body, and are thereafter cooled slowly.

10. An annealed, siliconized silicon carbide body which is substantially free from internal faults and stress caused by thermal shock and which is not subject to exudation of free silicon on long continued heating at high temperatures and which consists essentially of silicon carbide together with not more than about 10% by weight of free silicon and not more than about 5% by weight of free carbon, the silicon carbide content of said body after annealing being greater than that before annealing.

11. A body as set forth in claim 10 in which the body is an electrical resistance body and at least a substantial portion of said silicon carbide is in the beta form.

12. A compound, integrally united, silicon carbide, electrical resistance body comprising a plurality of silicon carbide elements that are united by an annealed joint, said joint consisting essentially of silicon carbide at least a substantial portion of which is in the beta form, together with not more than about 10% by weight of free silicon and not more than about 5% by weight of free carbon, the silicon carbide content of said joint after annealing being greater than that before annealing.

References Cited in the file of this patent
UNITED STATES PATENTS

| | | |
|---|---|---|
| 1,694,167 | Dubilier | Dec. 4, 1928 |
| 1,819,554 | Hanson | Aug. 18, 1931 |
| 1,906,963 | Heyroth | May 2, 1933 |
| 2,319,323 | Heyroth | May 18, 1943 |
| 2,589,157 | Stalhane | Mar. 11, 1952 |
| 2,714,096 | Suchet | July 26, 1955 |
| 2,858,403 | Butler | Oct. 28, 1958 |
| 2,860,037 | Kamlet | Nov. 11, 1958 |
| 2,869,990 | Burgess | Jan. 20, 1959 |
| 2,941,962 | Van Der Beck | June 21, 1960 |